J. ADAMS.

Rotary Cultivator.

No. 67,700

Patented Aug 13, 1867.

Witnesses:
Chas A. Pettit
Solon E. Kenon

Inventor:
Jesse Adams
Per Munn & Co.
Attys.

United States Patent Office.

JESSE ADAMS, OF CLARKSVILLE, TEXAS.

Letters Patent No. 67,700, dated August 13, 1867.

---

IMPROVEMENT IN COTTON-CULTIVATOR.

---

*The Schedule referred to in these Letters Patent and making part of the same.*

---

TO ALL WHOM IT MAY CONCERN:

Be it known that I, JESSE ADAMS, of Clarksville, in the county of Red River, and State of Texas, have invented a new and improved Cotton-Cultivator; and I do hereby declare the following to be a full, clear, and exact description of the same; reference being had to the accompanying drawings, forming part of this specification, and in which—

Similar letters of reference indicate corresponding parts in the two figures.

Figure 1:
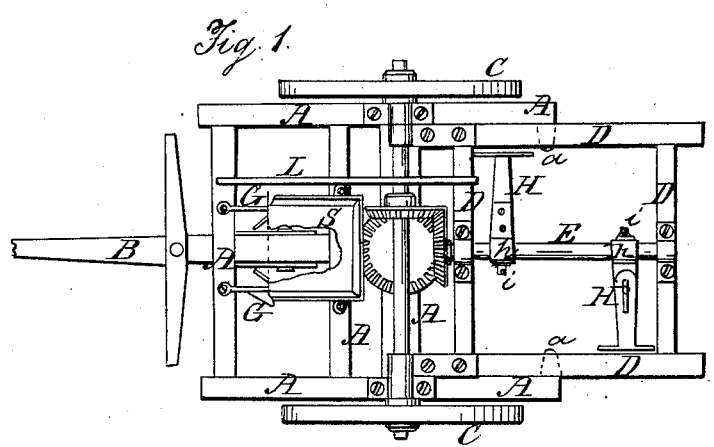
Figure 1 is a top view of my invention.
Figure 2:
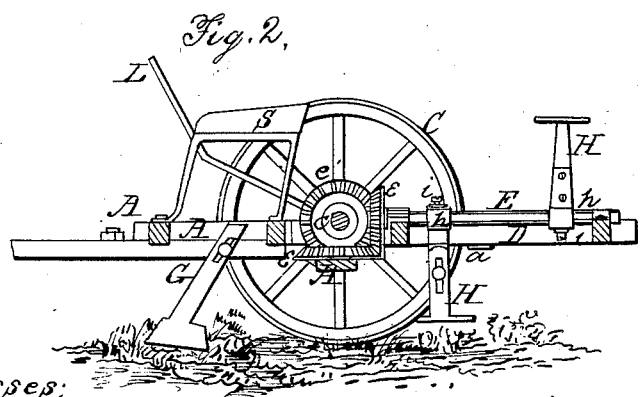
Figure 2 is a longitudinal vertical section of the same through the centre of my invention.

In this invention the hoes are made adjustable on a revolving shaft bearing in an adjustable frame.

In order that others skilled in the art to which my invention appertains may be enabled to make and use the same, I will proceed to describe it in detail.

In the drawings, A A represent the fixed parts of the frame of my improved cotton-cultivator; B being the draw-beam, and S the driver's seat. C C are the draught-wheels running on an axle, $c$, extending across the instrument. To the fixed frame A or the axle $c$ is hinged an adjustable frame, D, bearing a shaft, E, in its centre, which is rotated by the motion of the axle $c$, by means of a mitre-wheel, $c'$, an idler, $e'$, and a mitre-wheel, $e$, on the forward end of the shaft E. A series of hoes, H H', is attached to the shaft E by loops $h$ and set-screws $i$, so as to be adjustable in any position on the shaft. Any number of hoes may be used, and they may, by the adjusting arrangement above described, be placed at any required distance apart, which distance may be increased or diminished, as required by the condition of the cotton. A hand-lever, L, is fixed to the frame D and pivots over the axle $c$, its forward arm extending to the side of the driver's seat, so as to be within reach of his hand. By depressing the forward arm of this lever, the rear end of the frame D can be instantly raised and the mitre-pinions $e'$ and $e$ thrown out of gear, so as to stop the revolution of the hoes. When not raised in this position the frame D rests, near its centre, on two short, stout arms, $a\ a$, projecting inward from the sides of the frame A near its rear end. G G are two ploughs or cutters attached to the rear end of the draw-beam under the driver's seat, and cutting outward along either side of the row of cotton plants, leaving the required number of plants in the row between them. After they have thus passed over the ground and trimmed the row, the revolving hoes, following them, complete the work by cutting across the row at the proper intervals, and leaving the plants in hills at any required distance apart.

Having thus described my invention, what I claim as new, and desire to secure by Letters Patent, is—

1. The series of adjustable hoes H H attached to and working on the shaft E, substantially as and for the purpose described.

2. The hinged adjustable frame D, in combination with the revolving shaft E and lever L, substantially as and for the purpose specified.

To the above specification of my improvement I have signed my hand this twenty-second day of July, 1867.

JESSE ADAMS.

Witnesses:
NATHAN H. ELLSWORTH,
CHARLES A. PETTIT.